US012704756B2

(12) United States Patent
Cui et al.

(10) Patent No.: US 12,704,756 B2
(45) Date of Patent: Aug. 11, 2026

(54) LIQUID CRYSTAL PHASE SHIFTER, PHASE SHIFT CIRCUIT, AND ANTENNA

(71) Applicant: BOE Technology Group Co., Ltd., Beijing (CN)

(72) Inventors: Zhao Cui, Beijing (CN); Zhonglan Zhao, Beijing (CN); Feng Zhang, Beijing (CN); Wenqu Liu, Beijing (CN); Zhijun Lv, Beijing (CN); Liwen Dong, Beijing (CN); Detian Meng, Beijing (CN); Dongfei Hou, Beijing (CN); Yuqiao Li, Beijing (CN); Mengya Song, Beijing (CN); Guoteng Li, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 113 days.

(21) Appl. No.: 18/922,461

(22) Filed: Oct. 22, 2024

(65) Prior Publication Data

US 2025/0044656 A1 Feb. 6, 2025

Related U.S. Application Data

(63) Continuation of application No. PCT/CN2023/077863, filed on Feb. 23, 2023.

(51) Int. Cl.

*G02F 1/1368* (2006.01)
*G02F 1/1333* (2006.01)
*H01Q 3/36* (2006.01)

(52) U.S. Cl.

CPC ...... *G02F 1/1368* (2013.01); *G02F 1/133354* (2021.01); *G02F 1/133394* (2021.01); *H01Q 3/36* (2013.01)

(58) Field of Classification Search

CPC ............. G02F 1/1368; G02F 1/133394; G02F 1/133354; H01Q 3/36

See application file for complete search history.

(56) References Cited

U.S. PATENT DOCUMENTS

2018/0205156 A1 7/2018 Li et al.
2022/0107527 A1* 4/2022 Liu ...................... G09G 3/3648

FOREIGN PATENT DOCUMENTS

CN 110221468 A 9/2019
CN 112197891 A 1/2021

(Continued)

OTHER PUBLICATIONS

International Search Report mailed on Sep. 18, 2023, received for PCT Application No. PCT/CN2023/077863, filed on Feb. 23, 2023, 4 pages including English Translation.

(Continued)

*Primary Examiner* — David Y Chung
(74) *Attorney, Agent, or Firm* — XSENSUS LLP

(57) ABSTRACT

A liquid crystal phase shifter includes: a first substrate; a second substrate, provided opposite to the first substrate; a liquid crystal layer, provided between the first substrate and the second substrate; and a phase shift region, including a first electrode, a second electrode and a control circuit, where the first electrode is provided on a side of the first substrate close to the second substrate, the second electrode is provided on a side of the second substrate close to the first substrate, an orthographic projection of the second electrode on the first substrate partially overlaps with an orthographic projection of the first electrode on the first substrate, and the second electrode is grounded.

19 Claims, 7 Drawing Sheets

(56) References Cited

FOREIGN PATENT DOCUMENTS

| | | | |
|---|---|---|---|
| CN | 112886251 | A | 6/2021 |
| CN | 113659342 | A | 11/2021 |
| CN | 115621687 | A | 1/2023 |
| WO | 2022193042 | A1 | 9/2022 |

OTHER PUBLICATIONS

Written Opinion mailed on Sep. 18, 2023, received for PCT Application No. PCT/CN2023/077863, filed on Feb. 23, 2023, 7 pages including English Translation.

* cited by examiner

Phase/°

-1200
-1250
-1300
-1350
-1400
-1450

0 5 10 15 20 25 30

Threshold Voltage/V

LIQUID CRYSTAL PHASE SHIFTER, PHASE SHIFT CIRCUIT, AND ANTENNA

CROSS-REFERENCE TO RELATED APPLICATION

This disclosure is a continuation application of PCT Application No. PCT/CN2023/077863, filed Feb. 23, 2023, the entire content of which is incorporated herein by reference.

TECHNICAL FIELD

This disclosure relates to the field of display technology, and in particular to a liquid crystal phase shifter, a phase shift circuit and an antenna.

BACKGROUND

The liquid crystal phase shifter changes the dielectric constant of the liquid crystal material by adjusting the loading voltage on the first electrode, so that the phase constant of the electromagnetic wave on the device changes, thereby achieving the effect of adjusting the phase shift amount.

At different temperatures inside the cell, the relationship between the deflection angle of the liquid crystal material and the voltage between the signal line and the microstrip line is different. If the electromagnetic wave signal is controlled by directly inputting the loading voltage according to the relationship between the phase constant of the electromagnetic wave and the voltage at a certain temperature, it will result in poor control accuracy.

It should be noted that the information disclosed in the above background technology section is only used to enhance the understanding of the background of this disclosure, and therefore may include information that does not constitute the prior art known to ordinary technicians in the field.

SUMMARY

This disclosure is directed to overcome the deficiencies of the above-mentioned prior art and to provide a liquid crystal phase shifter, a phase shift circuit and an antenna.

According to an aspect of this disclosure, a liquid crystal phase shifter is provided and includes: a first substrate, a second substrate, a liquid crystal layer and at least one phase shift unit. The second substrate is provided opposite to the first substrate. The liquid crystal layer is provided between the first substrate and the second substrate. As to the at least one phase shift unit, the phase shift unit includes a first electrode, a second electrode and a control circuit. The first electrode is provided on a side of the first substrate close to the second substrate. The second electrode is provided on a side of the second substrate close to the first substrate, an orthographic projection of the second electrode on the first substrate partially overlaps with an orthographic projection of the first electrode on the first substrate, and the second electrode is grounded. The control circuit is provided between the first electrode and the second electrode, and the control circuit includes a transistor layer and a thermoelectric conversion unit. The transistor layer is provided on a side of the first substrate, and the transistor layer includes a first transistor. The thermoelectric conversion unit is provided on a side of the transistor layer away from the first substrate, one side of the thermoelectric conversion unit is connected to a source of the first transistor through a via, and another side of the thermoelectric conversion unit is provided adjacent to the liquid crystal layer.

In an embodiment of this disclosure, the transistor layer further includes a second transistor, the second transistor is provided in a same layer as the first transistor, and a drain of the second transistor is connected to the first electrode.

In an embodiment of this disclosure, the transistor layer includes an active layer, a gate insulating layer and a gate layer. The active layer is provided on a side of the first substrate, where the active layer includes a first active part and a second active part. The gate insulating layer is provided on a side of the active layer away from the first substrate and covers the first active part and the second active part. The gate layer is provided on a side of the gate insulating layer away from the first substrate, and includes a first control lead and a second control lead; where an orthographic projection of the first control lead on the first substrate overlaps with an orthographic projection of the first active part on the first substrate, thereby forming a gate of the first transistor; and an orthographic projection of the second control lead on the first substrate overlaps with an orthographic projection of the second active part on the first substrate, thereby forming a gate of the second transistor.

In an embodiment of this disclosure, the phase shift unit further includes a first conductive layer, the first conductive layer is provided on a side of the gate layer away from the first substrate, and the first conductive layer includes a first conductive structure, a second conductive structure, a third conductive structure and a fourth conductive structure. The first conductive structure is connected to the first active part, thereby forming the source of the first transistor; the second conductive structure is connected to the first active part, thereby forming a drain of the first transistor; the third conductive structure is connected to the second active part, thereby forming a source of the second transistor; and the fourth conductive structure is connected to the second active part, thereby forming a drain of the second transistor.

In an embodiment of this disclosure, the thermoelectric conversion unit includes a second conductive layer, a piezoelectric material layer and a third conductive layer. The second conductive layer is provided on a side of the first conductive layer away from the first substrate, and the second conductive layer includes a sensing electrode. The piezoelectric material layer is provided on a side of the second conductive layer away from the first substrate, and the piezoelectric material layer includes a thermoelectric sensing part. The third conductive layer is provided on a side of the piezoelectric material layer away from the first substrate, and the third conductive layer includes an output electrode. A planarization layer is provided between the second conductive layer and the first conductive layer, and the output electrode is connected to the source of the first transistor through a via on the planarization layer.

In an embodiment of this disclosure, the first electrode is located on the second conductive layer.

In an embodiment of this disclosure, the liquid crystal phase shifter includes a plurality of the phase shift units.

In an embodiment of this disclosure, a material of the thermoelectric sensing part is vinylidene fluoride-trifluoroethylene copolymer (P(VDF/TrFE)).

In an embodiment of this disclosure, a plurality of thermal conductive holes are provided on the second substrate, and a thermal conductive layer group is provided on a side of the second substrate close to the first substrate.

In an embodiment of this disclosure, the thermal conductive holes are through holes, and the plurality of the thermal conductive holes are arrayed on the second substrate.

In an embodiment of this disclosure, the thermal conductive layer group includes a first buffer layer, a barrier layer and a second buffer layer; the first buffer layer is provided on a side of the second substrate close to the first substrate, the barrier layer is provided on a side of the first buffer layer close to the first substrate, and the second buffer layer is provided on a side of the barrier layer close to the first substrate.

In an embodiment of this disclosure, the phase shift unit further includes a third buffer layer, and the third buffer layer is provided between the first substrate and the active layer.

In an embodiment of this disclosure, a first passivation layer is provided on a side of the first electrode away from the first substrate, a first alignment layer is provided on a side of the first passivation layer away from the first substrate, a second passivation layer is provided on a side of the second electrode away from the second substrate, a second alignment layer is provided on a side of the second passivation layer away from the second substrate, and a spacer part is provided between the first alignment layer and the second alignment layer.

According to another aspect of this disclosure, a phase shift circuit is provided and includes the liquid crystal phase shifter according to any embodiment of the forgoing aspect of this disclosure and a signal processing module, where a drain of the first transistor is connected to an input end of the signal processing module, an output end of the signal processing module is connected to the first electrode, and the signal processing module is configured to output an electrical driving signal based on a first electrical signal.

In an embodiment of this disclosure, a source of the second transistor is connected to the output end of the signal processing module.

According to another aspect of this disclosure, an antenna is provided and includes the phase shift circuit according to any embodiment of the forgoing another aspect of this disclosure.

It is to be understood that both the foregoing general description and the following detailed description are exemplary and explanatory only and are not restrictive of this disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Apparently, the drawings in the following description are only some embodiments of this disclosure, and those skilled in the art can obtain other drawings according to these drawings without creative efforts.

DESCRIPTION OF REFERENCE NUMERALS IS AS FOLLOWS

Figure 1:
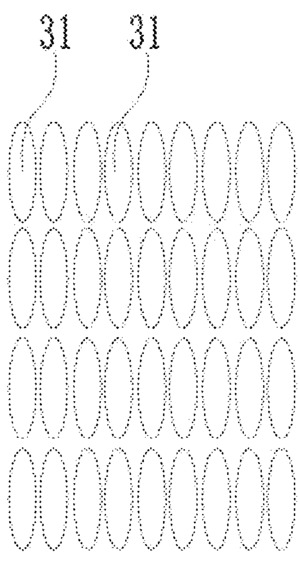
FIG. 1 is a schematic arrangement diagram of liquid crystal molecules according to some embodiments of this disclosure.

1—first substrate, 2—second substrate, 21—thermal conductive hole, 3—liquid crystal layer, 4—phase shift unit, 41—first electrode, 42—second electrode, 43—control circuit, 4301—sensing subcircuit, 4302—signal processing module, 4303—switch subcircuit, 4304—thermoelectric conversion unit, 4305—transmission line, 4306—reference signal line, 431—active layer, 4311—first active part, 4312—second active part, 432—gate insulation layer, 433—gate layer, 4331—first protruding part, 4332—second protruding part, 4333—first control lead, 4334—second control lead, 434—interlayer dielectric layer, 435—first conductive layer, 4351—first conductive structure, 4352—second conductive structure, 4353—third conductive structure, 4354—fourth conductive structure, 4355—first data line, 4356—second data line, 436—planarization layer, 437—second conductive layer, 4371—sensing electrode, 438—piezoelectric material layer, 4381—thermoelectric sensing part, 439—third conductive layer, 4391—output electrode, 44—third buffer layer, 51—first alignment layer, 52—second alignment layer, 6—spacer part, 7—thermal conductive layer group, 71—first buffer layer, 72—barrier layer, 73—second buffer layer, 81—first passivation layer, 82—second passivation layer.

DETAILED DESCRIPTION

Exemplary embodiments will now be described more fully with reference to the accompanying drawings. However, exemplary embodiments can be implemented in a variety of forms and should not be construed as limited to the embodiments set forth herein. Rather, these embodiments are provided so that this disclosure will be comprehensive and complete and fully convey the concepts of the exemplary embodiments to those skilled in the art. The same reference numerals in the drawings represent the same or similar structures, and thus their detailed descriptions will be omitted. In addition, the drawings are only schematic illustrations of this disclosure and are not necessarily drawn to scale.

Although relative terms such as "upper" and "lower" are used in this specification to describe the relative relationship of one illustrated component to another, these terms are used in this specification only for convenience, such as according to the orientation of the examples described in the drawings. It is understood that if the illustrated device is turned upside down, the component described as "upper" one will become the "lower" component. When a structure is "on" other structures, it may mean that the structure is formed integrally on the other structure, or that the structure is "directly" placed on the other structure, or that the structure is "indirectly" provided on the other structure through another structure.

The terms "a", "an", "the", "said" and "at least one" are used to indicate the presence of one or more elements/components/etc.; the terms "comprising/including" and "having" are used to express an open-ended inclusive meaning and mean that additional elements/components/etc. may exist in addition to the listed elements/components/etc.; the terms "first", "second" and "third" etc. are used merely as labels and are not intended to limit the quantity of related objects.

Figure 2:
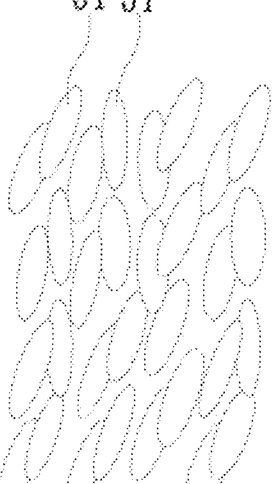
FIG. 2 is another schematic arrangement diagram of liquid crystal molecules according to some embodiments of this disclosure.
Figure 3:
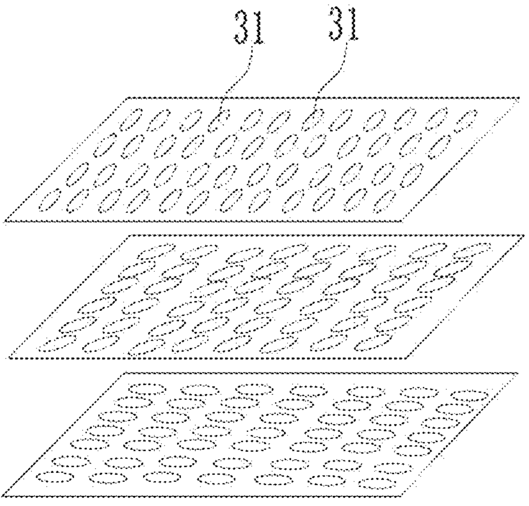
FIG. 3 is yet another schematic arrangement diagram of liquid crystal molecules according to some embodiments of this disclosure.

Liquid crystal is an aggregation state of matter between solid and liquid. Common liquid crystals are mainly smectic, nematic and cholesteric. The arrangement of smectic liquid crystal molecules is shown in FIG. 1, the arrangement of nematic liquid crystal molecules is shown in FIG. 2, and the arrangement of cholesteric liquid crystal molecules is shown in FIG. 3. The structure of nematic liquid crystal causes low intermolecular forces, which are easily affected by external electric or magnetic fields to change the molecular orientation. The dielectric anisotropy of liquid crystal materials and the free rotation of molecules make the liquid crystal materials in this state change the dielectric constant when they are externally stimulated (by electric or magnetic fields). Liquid crystal antenna is a kind of device that uses the dielectric anisotropy of liquid crystal to change the phase shift (amount) of liquid crystal phase shifter by controlling the deflection direction of liquid crystal, where the phase shift (amount) of liquid crystal phase shifter refers to the phase difference between the input port and the output port.

Figure 4:
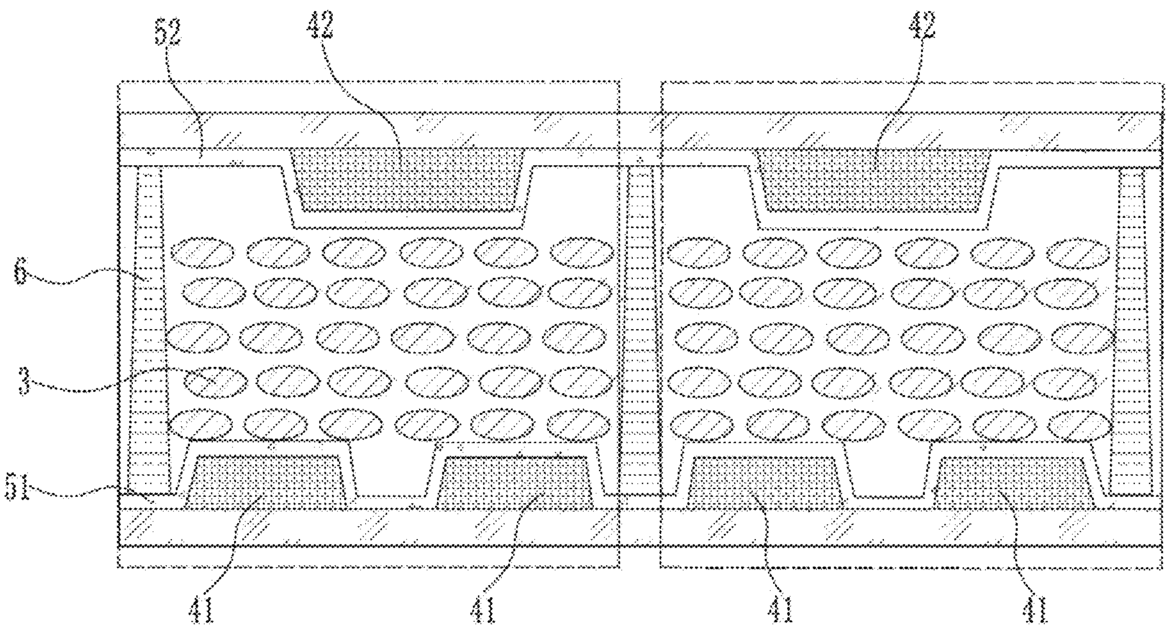
FIG. 4 is a cross-sectional schematic diagram of a liquid crystal phase shifter according to some embodiments of this disclosure.
Figures 5, 6:
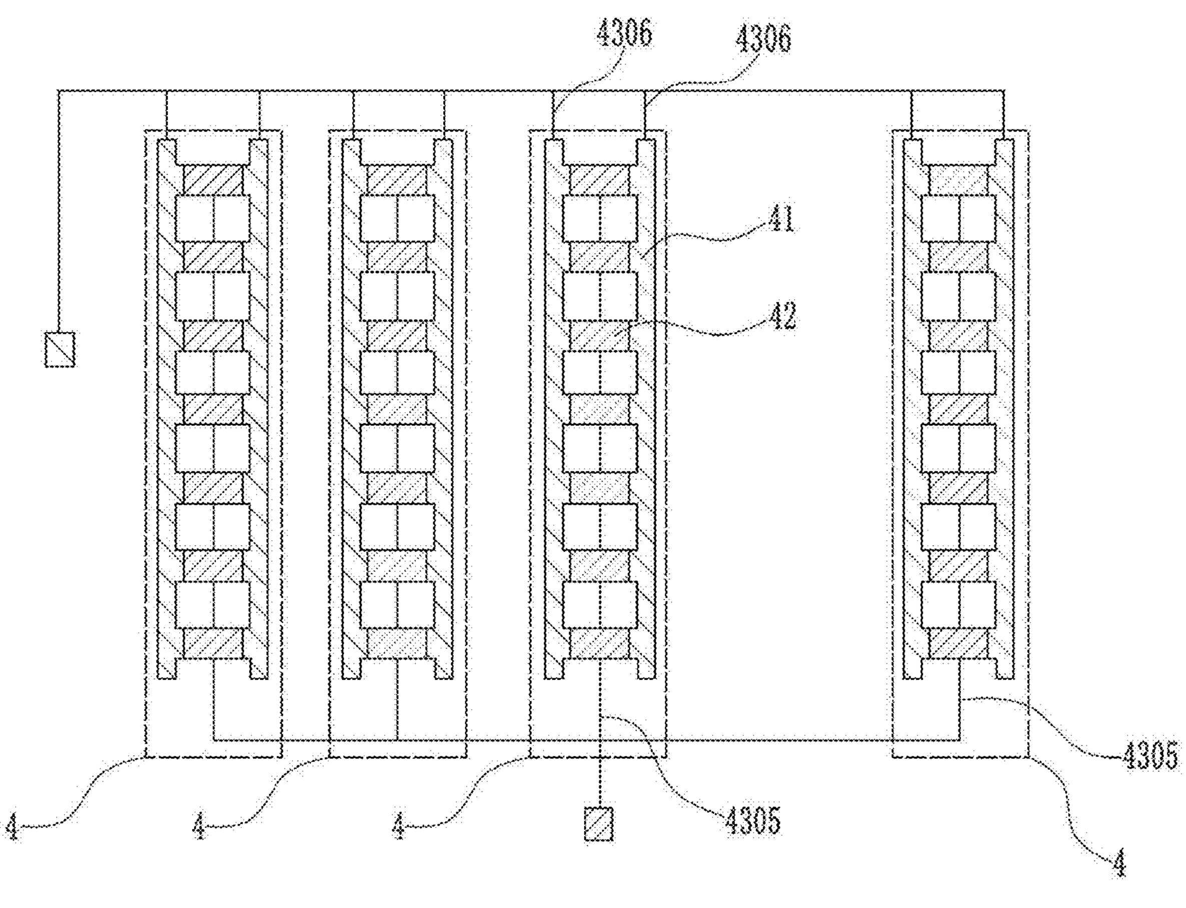
FIG. 5 is a schematic plan view of a liquid crystal phase shifter according to some embodiments of this disclosure.
FIG. 6 is a V-phi curve of a liquid crystal phase shifter at room temperature according to some embodiments of this disclosure.

As shown in FIG. 4 and FIG. 5, the liquid crystal phase shifter is a passive liquid crystal phase shifter, including a first substrate 1 and a second substrate 2 provided opposite to each other. A first electrode 41 is provided on a side of the first substrate 1 close to the second substrate 2, and the first electrode 41 is a transmission line electrode. A second electrode 42 is provided on a side of the second substrate 2 close to the first substrate 1, and the second electrode 42 is a microstrip line electrode. The first substrate 1 and the second substrate 2 are provided in a cell arrangement. A liquid crystal layer 3 is provided between the first substrate 1 and the second substrate 2. Orthographic projections of the first electrode 41 and the second electrode 42 on the first substrate 1 partially overlaps with each other. A capacitor(s) is formed by applying voltage to the first electrode 41 and the second electrode 42. Each capacitor serves as a phase shift unit 4, which deflects the liquid crystal molecules of the liquid crystal layer 3, thereby changing its dielectric constant, thus changing the phase constant of the electromagnetic wave signal, and finally changing the phase shift amount of the electromagnetic wave signal.

The first electrodes 41 of the liquid crystal phase shifter in FIG. 4 and FIG. 5 are connected in series, and the same loading voltage is directly and uniformly input from the peripheral binding pads to each first electrode 41 through the transmission line 4305, and each second electrode 42 is connected to the ground pad through the reference signal line 4306. The loading voltage between the first electrode 41 and the second electrode 42 of all phase shift units 4 is the same. The loading voltage of each first electrode 41 is uniformly adjusted, and a slight change in the loading voltage will have a greater impact on the phase shift amount of the electromagnetic wave signal. When the required adjustment amplitude of the phase shift amount is small, the change in the loading voltage can only be reduced. Even if the change in the loading voltage is set to the minimum, it will cause a relatively large change in the phase shift amount of the electromagnetic wave signal, thereby limiting the adjustment accuracy.

Figure 7:
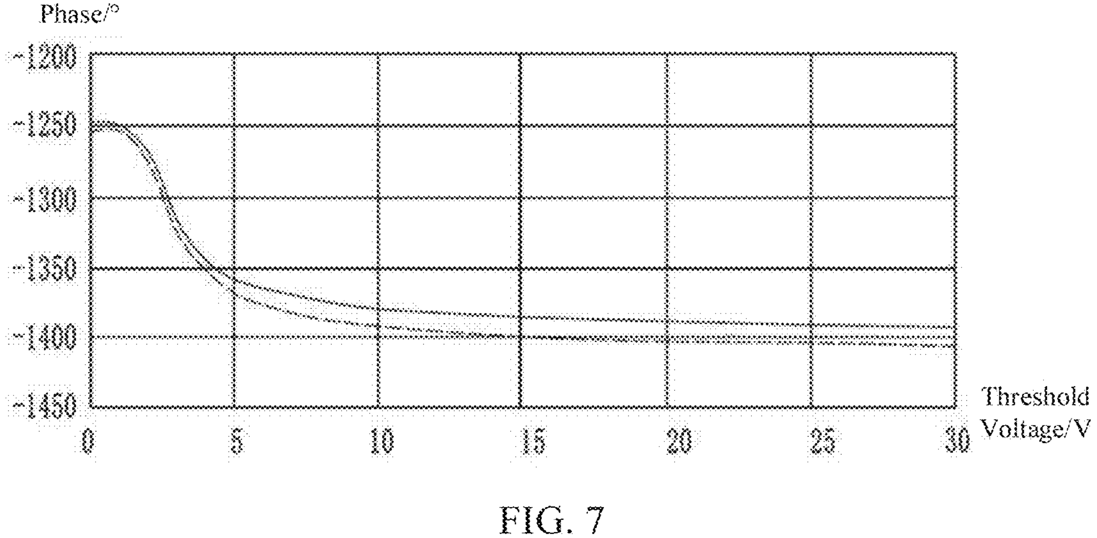
FIG. 7 is a V-phi curve of a liquid crystal phase shifter at 60° C. according to some embodiments of this disclosure.
Figure 8:
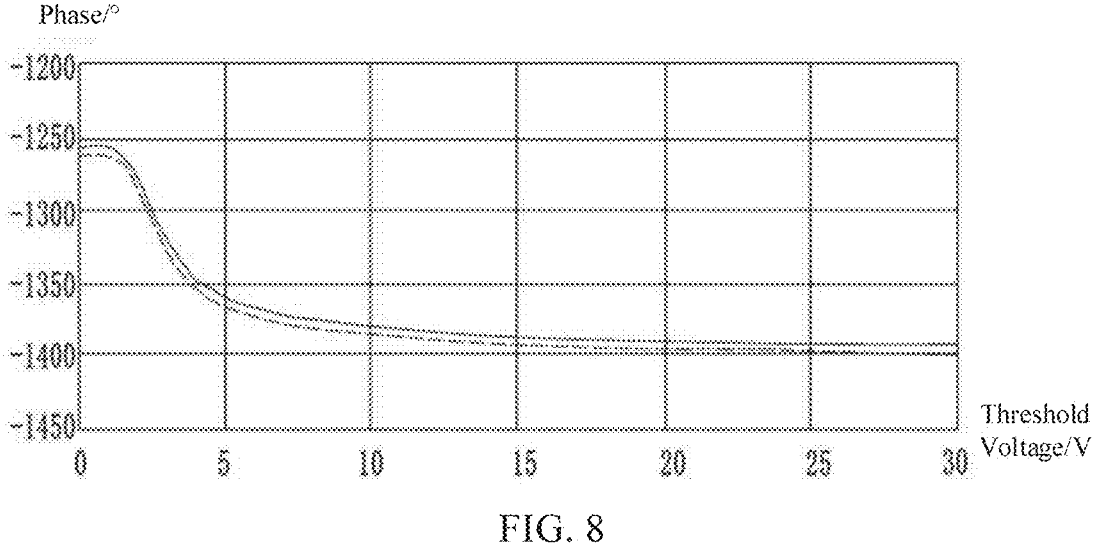
FIG. 8 is a V-phi curve of a liquid crystal phase shifter at 90° C. according to some embodiments of this disclosure.

Due to the requirements of the working environment temperature, two liquid crystal phase shifters were made, and the S parameters of the two liquid crystal phase shifters were tested at room temperature, 60° C., and 90° C. As shown in FIG. 6 to FIG. 8, the dotted lines represent the V-Phi curves of one liquid crystal phase shifter, and the solid lines represent the V-Phi curves of another liquid crystal phase shifter. It can be found that the trends of the V-Phi curves at different temperatures are roughly the same, where FIG. 6 illustrates the V-phi curves of two different liquid crystal materials at the room temperature, FIG. 7 illustrates the V-phi curves of two different samples at 60° C., and FIG. 8 illustrates the V-phi curves of two different samples at 90° C. At the room temperature, the threshold voltage is around 2V to 2.5V; the phase changes rapidly in the range of 2.5V to 6V, exceeding 100°; and the phase changes slightly in the range of 15V to 30V, within 10°. At 60° C., the threshold voltage is around 1V, the phase changes rapidly in the range of 1V to 5V, exceeding 110°, and the phase changes slightly in the range of 12V to 30V, around 10°. At 90° C., the threshold voltage is around 1V, the phase changes rapidly in the range of 1V to 5V, exceeding 100°; and the phase changes slightly in the range of 12V to 30V, around 10°.

As the working time increases, the temperature in the liquid crystal layer 3 increases. At different temperatures in the cell, the deflection threshold voltages of the liquid crystal material in the liquid crystal phase shifter are different, and the relationships between the deflection angles of the liquid crystal material and the voltages applied between the first electrode 41 and the second electrode 42 are different. Therefore, at different temperatures in the cell, when the phase of the electromagnetic wave signal is to be adjusted to a certain extent, the required voltages between the first electrode 41 and the second electrode 42 are different. In the process of adjusting the loading voltage, it is usually based on the relationship between the phase constant of the electromagnetic wave at room temperature and the voltage, and the electromagnetic wave signal is typically controlled by directly inputting the loading voltage, thereby resulting in poor control accuracy. So, it is necessary to ensure the accuracy of the loading voltage.

In view of above, some embodiments of this disclosure provide a liquid crystal phase shifter. As shown in FIG. 9 to FIG. 13, the liquid crystal phase shifter includes a first substrate 1, a second substrate 2, a liquid crystal layer 3 and at least one phase shift unit 4. The second substrate 2 is provided opposite to the first substrate 1. The liquid crystal layer 3 is provided between the first substrate 1 and the second substrate 2. The phase shift unit 4 includes a first electrode 41, a second electrode 42 and a control circuit 43, where the first electrode 41 is provided on a side of the first substrate 1 close to the second substrate 2, the second electrode 42 is provided on a side of the second substrate 2 close to the first substrate 1, and the orthographic projection of the second electrode 42 on the first substrate 1 partially overlaps with the orthographic projection of the first electrode 41 on the first substrate 1. The second electrode 42 is grounded. The control circuit 43 is provided between the first electrode 41 and the second electrode 42, and the control circuit 43 includes a transistor layer and a thermoelectric conversion unit 4304. The transistor layer is provided on a side of the first substrate 1, and the transistor layer includes a first transistor. The thermoelectric conversion unit 4304 is provided on a side of the transistor layer away from the first substrate 1, one side of the thermoelectric conversion unit 4304 is connected to the source of the first transistor through a via, and the other side of the thermoelectric conversion unit 4304 is provided adjacent to the liquid crystal layer 3.

The temperature of the liquid crystal layer 3 between the first electrode 41 and the second electrode 42 of the phase shift unit 4 is converted into a capacitance value by the thermoelectric conversion unit 4304, and the capacitance value is stored on the thermoelectric conversion unit 4304. The thermoelectric conversion unit 4304 may be discharged by turning on the first transistor, thereby converting the capacitance value into a first electrical signal. The first electrical signal can be processed by providing a signal processing module 4302, so as to output an electrical driving signal. The electrical driving signal is output to the first electrode 41, so that a capacitor is formed between the first electrode 41 and the second electrode 42, thereby controlling the phase shift amount of the electromagnetic wave signal. The electrical driving signal is obtained based on the real-time temperature of the liquid crystal layer 3 between the first electrode 41 and the second electrode 42, and the loading voltage applied to the first electrode 41 is adjusted according to the temperature change, so that the phase change of the electromagnetic wave signal can be accurately controlled, and the influence of temperature change on the adjustment accuracy of the phase shift amount is eliminated.

The liquid crystal phase shifter according to some embodiments of this disclosure is described in detail below with reference to specific examples.

Figure 9:
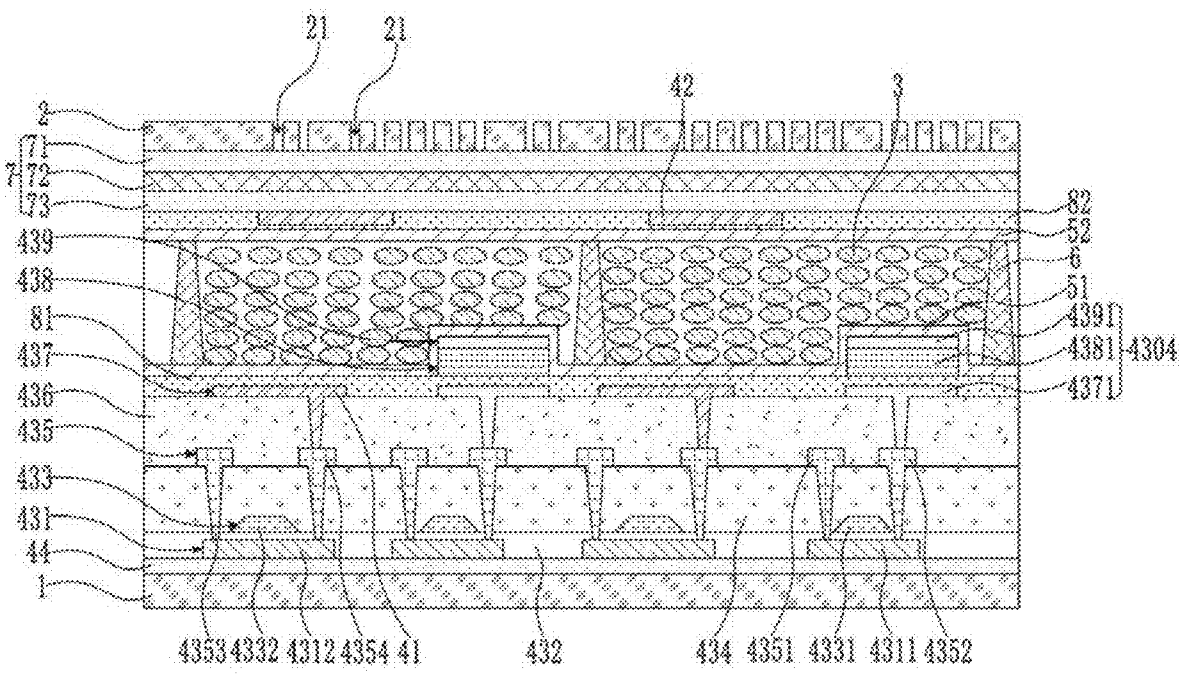
FIG. 9 is a cross-sectional schematic diagram of another liquid crystal phase shifter according to some embodiments of this disclosure.
Figure 10:
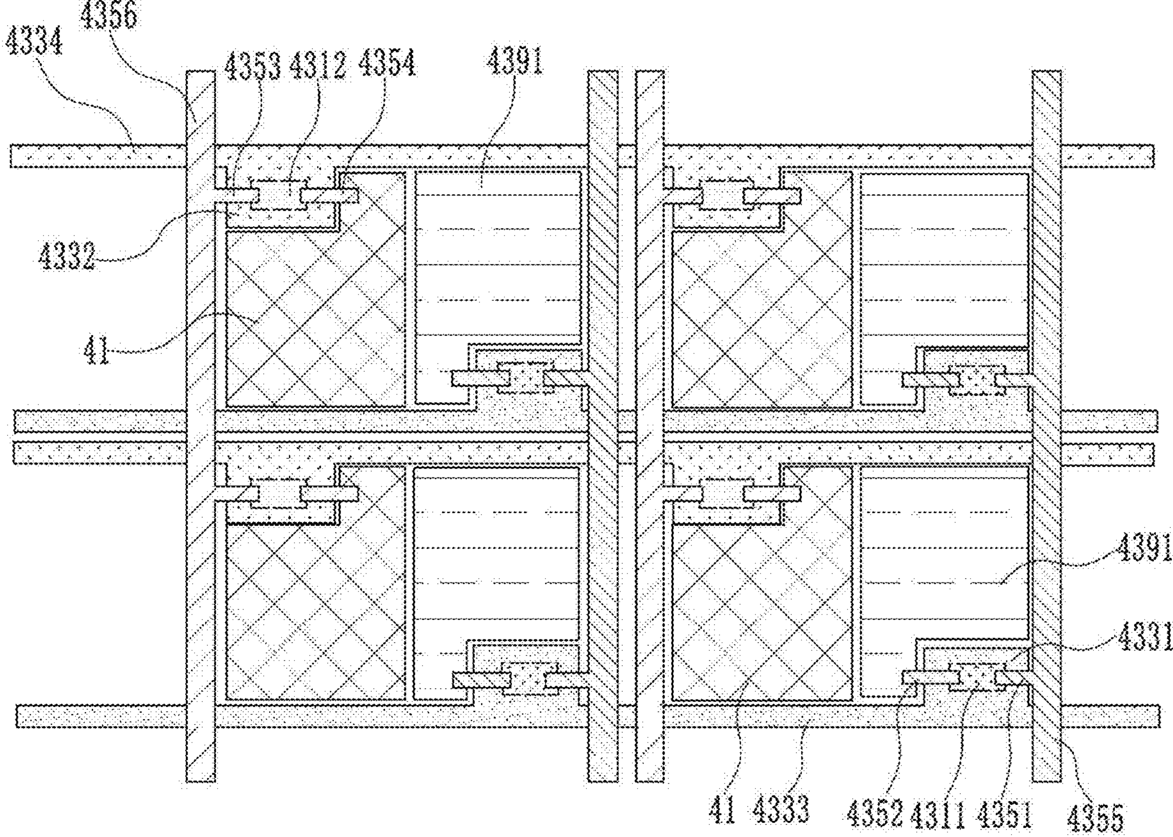
FIG. 10 is a plan view of another structure of a liquid crystal phase shifter provided on a first substrate according to some embodiments of this disclosure.
Figure 11:
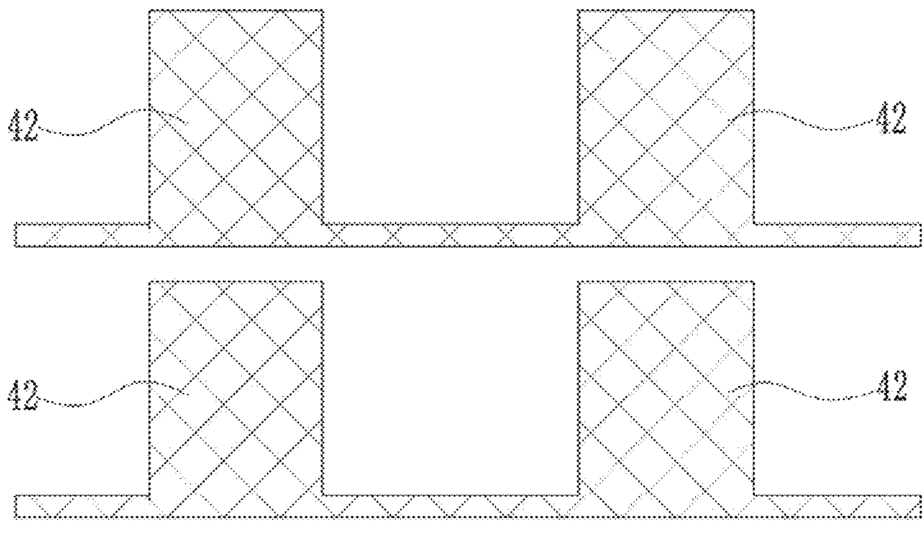
FIG. 11 is a plan view of another structure of a liquid crystal phase shifter provided on a second substrate according to some embodiments of this disclosure.

An exemplary structure of the liquid crystal phase shifter is described below. As shown in FIG. 9 to FIG. 11, the liquid crystal phase shifter includes a first substrate 1 and a second substrate 2, where the first substrate 1 and the second substrate 2 are provided in a cell arrangement, and a liquid crystal layer 3 is provided between the first substrate 1 and the second substrate 2. The liquid crystal phase shifter further includes a phase shift unit 4 for controlling the deflection angle of the liquid crystal material, where the phase shift unit 4 includes a first electrode 41 and a second electrode 42. The first electrode 41 is provided on a side of the first substrate 1 facing the second substrate 2, and the second electrode 42 is provided on a side of the second substrate 2 facing the first substrate 1, and the orthographic projection of the first electrode 41 on the first substrate 1 partially overlaps with the orthographic projection of the second electrode 42 on the first substrate 1.

The phase shift unit 4 further includes a control circuit 43, which includes an active layer 431, a gate insulating layer 432, a gate layer 433, an interlayer dielectric layer 434 and a first conductive layer 435. The active layer 431 is provided on a side of the first substrate 1. The gate insulating layer 432 is provided on a side of the active layer 431 away from the first substrate 1. The gate layer 433 is provided on a side of the gate insulating layer 432 away from the first substrate 1. The interlayer dielectric layer 434 is provided on a side of the gate layer 433 away from the first substrate 1. The first conductive layer 435 is provided on a side of the interlayer dielectric layer 434 away from the first substrate 1. The phase shift unit 4 may further include a third buffer layer 44, which is provided between the first substrate 1 and the active layer 431.

The active layer 431 includes a first active part 4311 and a second active part 4312. The gate layer 433 includes a first control lead 4333 and a second control lead 4334. The first control lead 4333 has a first protruding part 4331 protruding along a second direction, and the orthographic projection of the first protruding part 4331 on the substrate overlaps with the orthographic projection of the channel region of the first active part 4311 on the substrate, thereby forming the gate of the first transistor. The second control lead 4334 has a second protruding part 4332 protruding along the second direction, and the orthographic projection of the second protruding part 4332 on the substrate overlaps with the orthographic projection of the channel region of the second active part 4312 on the substrate, thereby forming the gate of the second transistor. The first control lead 4333 and the second control lead 4334 are both provided along the first direction. It should be noted that the second direction is perpendicular to the first direction.

The first conductive layer 435 includes a first conductive structure 4351, a second conductive structure 4352, a third conductive structure 4353, and a fourth conductive structure 4354 provided along the first direction, and a first data line 4355 and a second data line 4356 extending along the second direction. The first conductive structure 4351 is connected to the first data line 4355, and the orthographic projection of the first conductive structure 4351 on the first substrate 1 overlaps and is connected with the orthographic projection of a doping region of the first active part 4311 on the first substrate 1, thereby forming the source of the first transistor. The orthographic projection of the second conductive structure 4352 on the first substrate 1 overlaps and is connected with the orthographic projection of another doping region of the first active part 4311 on the first substrate 1, thereby forming the drain of the first transistor. The third conductive structure 4353 is connected to the second data line 4356, and the orthographic projection of the third conductive structure 4353 on the first substrate 1 overlaps and is connected with the orthographic projection of a doping region of the second active part 4312 on the first substrate 1, thereby forming the source of the second transistor. The orthographic projection of the fourth conductive structure 4354 on the first substrate 1 overlaps and is connected with the orthographic projection of another doping region of the second active part 4312 on the first substrate 1, thereby forming the drain of the second transistor.

It can be understood that the first active part 4311 and the second active part 4312 can be formed through a single patterning process; the first control lead 4333 and the second control lead 4334 can be formed through a single patterning process; the first conductive structure 4351, the second conductive structure 4352, the third conductive structure 4353 and the fourth conductive structure 4354 can be formed through a single patterning process; thereby reducing the manufacturing cost of the first transistor and the second transistor.

The output electrode 4391 has a first notch, and the first notch is adapted to the shape and size of the first protruding part 4331. The first electrode 41 has a second notch, and the second notch is adapted to the shape and size of the second protruding part 4332. The first protruding part 4331 and the output electrode 4391 are spliced to form a first rectangular structure, the second protruding part 4332 and the first electrode 41 are spliced to form a second rectangular structure, and the orthographic projection of the first rectangular structure on the first substrate 1 and the orthographic projection of the second rectangular structure on the first substrate 1 are located between the orthographic projection of the first data line 4355 on the first substrate 1 and the orthographic projection of the second data line 4356 on the second substrate 2. The orthographic projection of the output electrode 4391 on the first substrate 1 and the orthographic projection of the first electrode 41 on the first substrate 1 are located between the orthographic projection of the first control lead 4333 on the first substrate 1 and the orthographic projection of the second control lead 4334 on the first substrate 1.

The liquid crystal phase shifter may include a plurality of phase shift units 4, where the drain of the first transistor in each phase shift unit 4 is connected to the signal processing module 4302, and the source of the second transistor in each phase shift unit 4 is connected to the signal processing module 4302. The plurality of phase shift units 4 are arranged in a rectangular array, including multiple rows of phase shift units 4 distributed along the first direction and multiple columns of phase shift units 4 distributed along the second direction. The first conductive structures 4351 of the first transistors in the same column of phase shift units 4 may share one first data line 4355, and the second conductive structures 4352 of the second transistors in the same column of phase shift units 4 may share one second data line 4356. The first protruding parts 4331 of the first transistors in the same row of phase shift units 4 are located on one first control lead 4333, and the second protruding parts 4332 of the second transistors in the same row of phase shift units 4 are located on one second control lead 4334.

The control circuit 43 further includes a second conductive layer 437, a piezoelectric material layer 438 and a third conductive layer 439. The second conductive layer 437 is provided on a side of the first conductive layer 435 away from the first substrate 1, and the second conductive layer 437 includes a sensing electrode 4371. The piezoelectric material layer 438 is provided on a side of the sensing electrode 4371 away from the first substrate 1, and the piezoelectric material layer 438 includes a thermoelectric sensing part 4381. The third conductive layer 439 is provided on a side of the thermoelectric sensing part 4381 away from the first substrate 1, and the third conductive layer 439 includes an output electrode 4391. A planarization layer 436 is provided between the second conductive layer 437 and the first conductive layer 435, and the sensing electrode 4371 is connected to the source of the first transistor through a via on the planarization layer 436.

A first passivation layer 81 is provided on a side of the first electrode 41 away from the first substrate 1, a first alignment layer 51 is provided on a side of the first passivation layer 81 away from the first substrate 1, a second alignment layer 52 is provided on a side of the second electrode 42 away from the second substrate 2, and the piezoelectric material layer 438 and the third conductive layer 439 are stacked between the first passivation layer 81 and the first alignment layer 51. A second passivation layer 82 is provided on a side of the second electrode 42 away from the second substrate 2, a second alignment layer 52 is provided on a side of the second passivation layer 82 away from the second substrate 2, and a plurality of spacer parts 6 are provided between the first alignment layer 51 and the second alignment layer 52, so that a receiving cavity is formed between the second substrate 2 and the first substrate 1, and the receiving cavity is filled with liquid crystal molecules to form the liquid crystal layer 3.

The first electrode 41 is located in the second conductive layer 437. The first electrode 41 is connected to the drain of the second transistor through a via on the planarization layer 436. The first electrode 41 and the sensing electrode 4371 are provided on the same layer, thereby reducing the thickness of the liquid crystal phase shifter. The first electrode 41 and the sensing electrode 4371 can be formed through a single patterning process, thereby reducing the manufacturing cost of the liquid crystal phase shifter.

As the working time increases, the temperature in the liquid crystal layer 3 increases. When it increases to a certain level, it will cause the failure of the liquid crystal material, thereby causing the performance failure of the liquid crystal phase shifter. Therefore, a plurality of thermal conductive holes 21 are provided on the second substrate 2, which can transfer the heat in the liquid crystal layer 3. The thermal conductive holes 21 are through holes, and the plurality of thermal conductive holes 21 are distributed in an array on the second substrate 2. The aperture of the thermal conductive holes 21 is 0.5-1 mm, and the spacing between two adjacent thermal conductive holes 21 is 2 mm. During production, the second substrate 2 can be thinned to a certain thickness first, and a plurality of groups of thermal conductive holes 21 can be formed on the second substrate 2 by laser drilling or wet etching, with each group of thermal conductive holes 21 being located directly above each phase shift unit 4.

In addition, a thermal conductive layer group 7 is provided between the second substrate 2 and the second electrode 42. The thermal conductive layer group 7 includes a first buffer layer 71, a barrier layer 72, and a second buffer layer 73. The first buffer layer 71 is provided on a side of second substrate 2 close to the first substrate 1, the barrier layer 72 is provided on a side of the first buffer layer 71 close to the first substrate 1, the second buffer layer 73 is provided on a side of the barrier layer 72 close to the first substrate 1, and the second electrode 42 is provided on a side of the second buffer layer 73 away from the second substrate 2. The thermal conductive layer group 7 not only blocks water and oxygen, but also dissipates the heat generated in the liquid crystal layer 3 during the operation of the liquid crystal phase shifter, so that the temperature in the liquid crystal layer 3 can be stable, thereby ensuring the performance effectiveness of the liquid crystal material and, on the other hand, ensuring the phase shift stability of the phase shifter to the electromagnetic wave signal.

Figure 12:
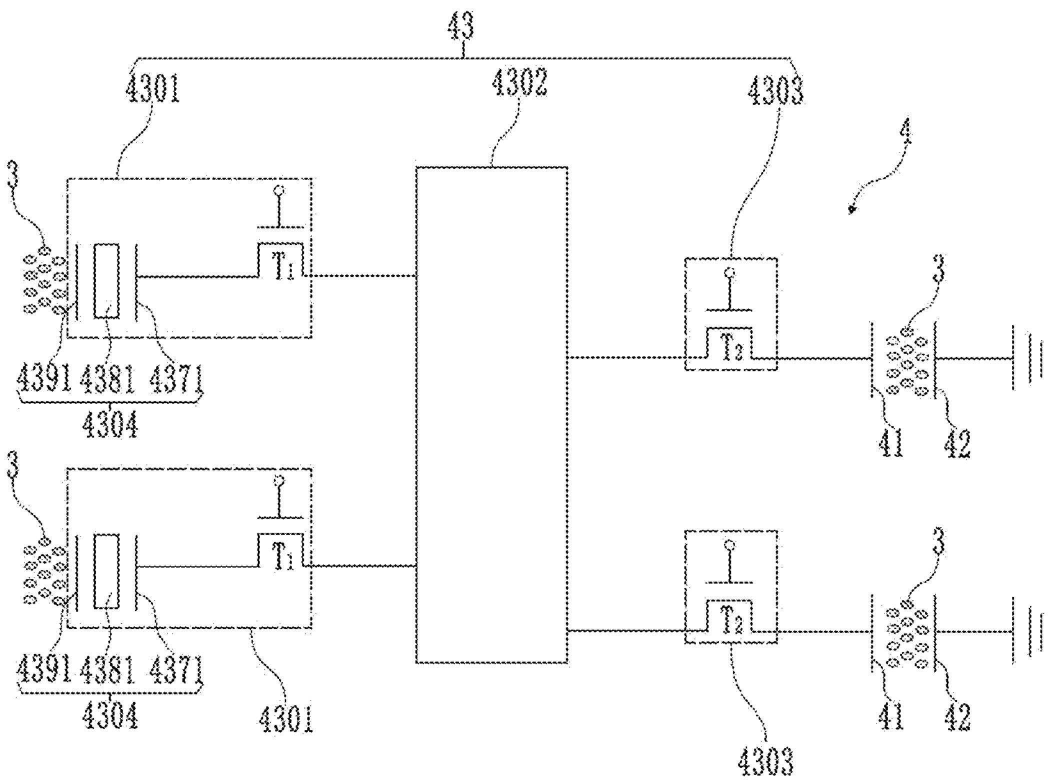
FIG. 12 is a principle diagram of a phase shift circuit according to some embodiments of this disclosure.
Figure 13:
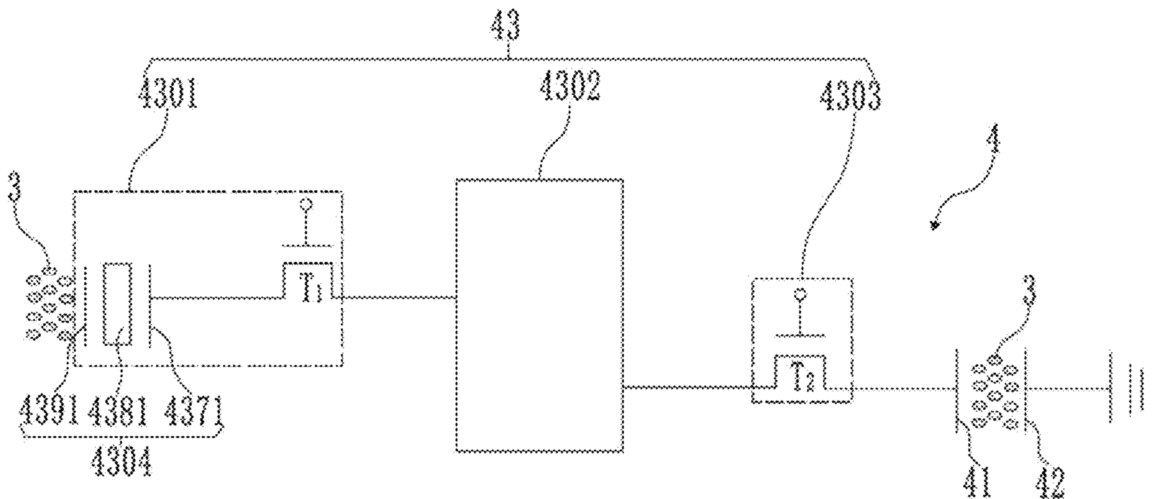
FIG. 13 is a principle diagram of another phase shift circuit according to some embodiments of this disclosure.

Some embodiments of this disclosure provide a phase shift circuit. As shown in FIG. 12 and FIG. 13, a phase shift circuit includes the liquid crystal phase shifter according to some embodiments of this disclosure described above and a signal processing module 4302, where the drain of the first transistor T1 is connected to the input end of the signal processing module 4302, the output end of the signal processing module 4302 is connected to the first electrode 41, and the signal processing module 4302 is configured to output an electrical driving signal based on a first electrical signal. As to the beneficial effects of the phase shift circuit, the beneficial effects of the liquid crystal phase shifter can be referred to, which will not be repeated here.

The phase shift circuit according to some embodiments of this disclosure is described in detail below in conjunction with specific examples.

As shown in FIG. 12 and FIG. 13, the liquid crystal phase shifter includes a first electrode 41 and a second electrode 42, and the second electrodes 42 are connected to a grounding part. Each first electrode 41 is controlled by one control circuit 43. The control circuit 43 includes a sensing subcircuit 4301 and a signal processing module 4302. The output end of the sensing subcircuit 4301 is connected to the input end of the signal processing module 4302, and the output end of the signal processing module 4302 is connected to the first electrode 41. The sensing subcircuit 4301 is configured to convert the temperature in the liquid crystal layer 3 into a first electrical signal, and the signal processing module 4302 is configured to output an electrical driving signal based on the first electrical signal. The electrical driving signal is obtained based on the temperature of the liquid crystal layer 3 between the phase shift units 4, so the loading voltage on the first electrode 41 corresponds to the phase change, thereby causing the adjustment accuracy of the phase shift amount to be more accurate.

However, since the liquid crystal phase shifter usually includes a plurality of phase shift units 4. In order to individually adjust each phase shift unit 4, the control circuit 43 further includes a switch subcircuit 4303. The switch subcircuit 4303 is connected between the signal processing module 4302 and the first electrode 41, where the input end of the switch subcircuit 4303 is connected to the output end of the signal processing module 4302, and the output end of the switch subcircuit 4303 is connected to the first electrode 41. The switch subcircuit 4303 is configured to control the on and off of the electrical driving signal. The adjustment of the phase shift amount of the electromagnetic wave signal is achieved by the combined action of each phase shift unit 4, and the phase shift amount of the electromagnetic wave signal can be adjusted by controlling the number of phase shift units 4 that are turned on.

The sensing subcircuit 4301 includes a thermoelectric conversion unit 4304 and a first transistor T1. The output end of the thermoelectric conversion unit 4304 is connected to the source of the first transistor T1, and the drain of the first transistor T1 is connected to the input end of the signal processing module 4302. The thermoelectric conversion unit 4304 is a capacitor structure, which converts the heat of the liquid crystal into a capacitance value stored on the thermoelectric conversion unit 4304 through the thermoelectric effect. The thermoelectric conversion unit 4304 can be discharged by turning on the first transistor T1, thereby converting the capacitance value into a first current signal to be transmitted to the signal processing module 4302.

The signal processing module 4302 processes the first current signal to form a driving current signal corresponding to the first current signal. The switch subcircuit 4303 may be a first transistor T2, and the source of the first transistor T2 is connected to the output end of the signal processing module 4302. Only when the first transistor T2 is turned on, the formed driving current signal can be loaded onto the first electrode 41 to charge the capacitor formed between the first electrode 41 and the second electrode 42.

The thermoelectric conversion unit 4304 includes a sensing electrode 4371, a thermoelectric sensing part 4381 and an output electrode 4391. The sensing electrode 4371 and the output electrode 4391 are provided opposite to each other. The thermoelectric sensing part 4381 is provided between the sensing electrode 4371 and the output electrode 4391. The output electrode 4391 is connected to the source of the first transistor T1. The sensing electrode 4371 is provided close to the liquid crystal layer 3. The material of the thermoelectric sensing part 4381 is vinylidene fluoride-trifluoroethylene copolymer (P(VDF-TrFE)).

Some embodiments of this disclosure further provide an antenna. The antenna may include the phase shift circuit provided above. As to the beneficial effects of the antenna, the beneficial effects of the phase shift circuit can be referred to, which will not be described in detail here.

Those skilled in the art will readily appreciate other embodiments of this disclosure after considering the specification and practicing the invention disclosed herein. This application is intended to cover any modification, use or adaptation of this disclosure, which follows the general principles of this disclosure and includes common knowledge or customary techniques in the art that are not disclosed in this disclosure. The specification and examples are intended to be exemplary only, and the true scope and spirit of this disclosure are indicated by the appended claims.

What is claimed is:

1. A liquid crystal phase shifter, comprising:

a first substrate;

a second substrate, provided opposite to the first substrate;

a liquid crystal layer, provided between the first substrate and the second substrate; and a phase shift region, comprising a first electrode, a second electrode and a control circuit, wherein the first electrode is provided on a side of the first substrate close to the second substrate, the second electrode is provided on a side of the second substrate close to the first substrate, an orthographic projection of the second electrode on the first substrate partially overlaps with an orthographic projection of the first electrode on the first substrate, and the second electrode is grounded;

wherein the control circuit is provided between the first electrode and the second electrode, and the control circuit comprises a transistor layer and a thermoelectric converter; the transistor layer is provided on a side of the first substrate, and the transistor layer comprises a first transistor; the thermoelectric converter is provided on a side of the transistor layer away from the first substrate, one side of the thermoelectric converter is connected to a source of the first transistor through a via, and another side of the thermoelectric converter is provided adjacent to the liquid crystal layer.

2. The liquid crystal phase shifter according to claim 1, wherein the transistor layer further comprises a second transistor, the second transistor is provided in a same layer as the first transistor, and a drain of the second transistor is connected to the first electrode.

3. The liquid crystal phase shifter according to claim 2, wherein the transistor layer comprises:

an active layer, provided on a side of the first substrate, wherein the active layer comprises a first active part and a second active part;

a gate insulating layer, provided on a side of the active layer away from the first substrate and covering the first active part and the second active part;

a gate layer, provided on a side of the gate insulating layer away from the first substrate, and comprising a first control lead and a second control lead; wherein an orthographic projection of the first control lead on the first substrate overlaps with an orthographic projection of the first active part on the first substrate, thereby forming a gate of the first transistor; and an orthographic projection of the second control lead on the first substrate overlaps with an orthographic projection of the second active part on the first substrate, thereby forming a gate of the second transistor.

4. The liquid crystal phase shifter according to claim 3, wherein the phase shift region further comprises a first conductive layer, the first conductive layer is provided on a side of the gate layer away from the first substrate, and the first conductive layer comprises a first conductive structure, a second conductive structure, a third conductive structure and a fourth conductive structure; wherein the first conductive structure is connected to the first active part, thereby forming the source of the first transistor; the second conductive structure is connected to the first active part, thereby forming a drain of the first transistor; the third conductive structure is connected to the second active part, thereby forming a source of the second transistor; and the fourth conductive structure is connected to the second active part, thereby forming a drain of the second transistor.

5. The liquid crystal phase shifter according to claim 4, wherein the thermoelectric converter comprises a second conductive layer, a piezoelectric material layer and a third conductive layer; the second conductive layer is provided on a side of the first conductive layer away from the first substrate, and the second conductive layer comprises a sensing electrode; the piezoelectric material layer is provided on a side of the second conductive layer away from the first substrate, and the piezoelectric material layer comprises a thermoelectric sensing part; the third conductive layer is provided on a side of the piezoelectric material layer away from the first substrate, and the third conductive layer comprises an output electrode; a planarization layer is provided between the second conductive layer and the first conductive layer, and the output electrode is connected to the source of the first transistor through a via on the planarization layer.

6. The liquid crystal phase shifter according to claim 5, wherein the first electrode is located on the second conductive layer.

7. The liquid crystal phase shifter according to claim 6, wherein the liquid crystal phase shifter comprises a plurality of the phase shift regions.

8. The liquid crystal phase shifter according to claim 5, wherein a material of the thermoelectric sensing part is vinylidene fluoride-trifluoroethylene copolymer (P(VDF/TrFE)).

9. The liquid crystal phase shifter according to claim 6, wherein a plurality of thermal conductive holes are provided on the second substrate, and a thermal conductive layer group is provided on a side of the second substrate close to the first substrate.

10. The liquid crystal phase shifter according to claim 9, wherein the thermal conductive holes are through holes, and the plurality of the thermal conductive holes are arrayed on the second substrate.

11. The liquid crystal phase shifter according to claim 9, wherein the thermal conductive layer group comprises a first buffer layer, a barrier layer and a second buffer layer; the first buffer layer is provided on a side of the second substrate close to the first substrate, the barrier layer is provided on a side of the first buffer layer close to the first substrate, and the second buffer layer is provided on a side of the barrier layer close to the first substrate.

12. The liquid crystal phase shifter according to claim 3, wherein the phase shift region further comprises a third buffer layer, and the third buffer layer is provided between the first substrate and the active layer.

13. The liquid crystal phase shifter according to claim 1, wherein a first passivation layer is provided on a side of the first electrode away from the first substrate, a first alignment layer is provided on a side of the first passivation layer away from the first substrate, a second passivation layer is provided on a side of the second electrode away from the second substrate, a second alignment layer is provided on a side of the second passivation layer away from the second substrate, and a spacer part is provided between the first alignment layer and the second alignment layer.

14. A phase shift circuit, comprising a liquid crystal phase shifter and a signal processor, wherein the liquid crystal phase shifter comprises:

a first substrate;

a second substrate, provided opposite to the first substrate;

a liquid crystal layer, provided between the first substrate and the second substrate; and a phase shift region, comprising a first electrode, a second electrode and a control circuit, wherein the first electrode is provided on a side of the first substrate close to the second substrate, the second electrode is provided on a side of the second substrate close to the first substrate, an orthographic projection of the second electrode on the first substrate partially overlaps with an orthographic projection of the first electrode on the first substrate, and the second electrode is grounded;

wherein the control circuit is provided between the first electrode and the second electrode, and the control circuit comprises a transistor layer and a thermoelectric converter; the transistor layer is provided on a side of the first substrate, and the transistor layer comprises a first transistor; the thermoelectric converter is provided on a side of the transistor layer away from the first substrate, one side of the thermoelectric converter is connected to a source of the first transistor through a via, and another side of the thermoelectric converter is provided adjacent to the liquid crystal layer; and wherein a drain of the first transistor is connected to an input end of the signal processing module, an output end of the signal processing module is connected to the first electrode, and the signal processing module is configured to output an electrical driving signal based on a first electrical signal.

15. The phase shift circuit according to claim 14, wherein the transistor layer further comprises a second transistor, the second transistor is provided in a same layer as the first transistor, and a drain of the second transistor is connected to the first electrode.

16. The phase shift circuit according to claim 15, wherein a source of the second transistor is connected to the output end of the signal processing module.

17. An antenna, comprising a phase shift circuit, wherein the phase shift circuit comprises a liquid crystal phase shifter and a signal processor, wherein the liquid crystal phase shifter comprises:

a first substrate;

a second substrate, provided opposite to the first substrate;

a liquid crystal layer, provided between the first substrate and the second substrate; and a phase shift region, comprising a first electrode, a second electrode and a control circuit, wherein the first electrode is provided on a side of the first substrate close to the second substrate, the second electrode is provided on a side of the second substrate close to the first substrate, an orthographic projection of the second electrode on the first substrate partially overlaps with an orthographic projection of the first electrode on the first substrate, and the second electrode is grounded;

wherein the control circuit is provided between the first electrode and the second electrode, and the control circuit comprises a transistor layer and a thermoelectric converter; the transistor layer is provided on a side of the first substrate, and the transistor layer comprises a first transistor; the thermoelectric converter is provided on a side of the transistor layer away from the first substrate, one side of the thermoelectric converter is connected to a source of the first transistor through a via, and another side of the thermoelectric converter is provided adjacent to the liquid crystal layer; and wherein a drain of the first transistor is connected to an input end of the signal processing module, an output end of the signal processing module is connected to the first electrode, and the signal processing module is configured to output an electrical driving signal based on a first electrical signal.

18. The antenna according to claim 17, wherein the transistor layer further comprises a second transistor, the second transistor is provided in a same layer as the first transistor, and a drain of the second transistor is connected to the first electrode.

19. The antenna according to claim 18, wherein a source of the second transistor is connected to the output end of the signal processing module.

* * * * *